US012746578B2

(12) United States Patent
Geurts

(10) Patent No.: US 12,746,578 B2
(45) Date of Patent: Sep. 29, 2026

(54) METHOD AND SYSTEM FOR TRAINING A MACHINE LEARNING MODEL FOR CLASSIFICATION OF COMPONENTS IN A MATERIAL STREAM

(71) Applicant: VITO NV, Mol (BE)

(72) Inventor: Roeland Geurts, Mol (BE)

(73) Assignee: VITO NV, Mol (BE)

(*) Notice: Subject to any disclaimer, the term of this patent is extended or adjusted under 35 U.S.C. 154(b) by 930 days.

(21) Appl. No.: 17/919,079

(22) PCT Filed: Apr. 16, 2021

(86) PCT No.: PCT/EP2021/059942

§ 371 (c)(1),
(2) Date: Oct. 14, 2022

(87) PCT Pub. No.: WO2021/209614

PCT Pub. Date: Oct. 21, 2021

(65) Prior Publication Data

US 2023/0169751 A1 Jun. 1, 2023

(30) Foreign Application Priority Data

Apr. 16, 2020 (EP) .................................... 20169824

(51) Int. Cl.
*G06V 10/774* (2022.01)
*B07C 5/342* (2006.01)
(Continued)

(52) U.S. Cl.
CPC ................ *B07C 5/342* (2013.01); *B09B 5/00* (2013.01); *G06V 10/58* (2022.01); *G06V 10/70* (2022.01);
(Continued)

(58) Field of Classification Search
CPC ... B07C 5/34; B07C 5/342; B07C 2501/0054; B09B 5/00; G06V 10/70; G06V 10/764;
(Continued)

(56) References Cited

U.S. PATENT DOCUMENTS 978,585 A 12/1910 Huber
2008/0029445 A1 2/2008 Russcher et al.
(Continued)

FOREIGN PATENT DOCUMENTS

CH 683674 A5 4/1994
CH 685807 A5 10/1995
(Continued)

OTHER PUBLICATIONS

Lukka et al. Zenrobotics recycler-robotic sorting using machine learning; Proceedings of the international conference on sensor-based sorting (SBS); No. 1; Citeseer, (Year: 2014).*
(Continued)

*Primary Examiner* — Sumati Lefkowitz
*Assistant Examiner* — Michael Adam Shariff
(74) *Attorney, Agent, or Firm* — Banner & Witcoff, Ltd.

(57) ABSTRACT

A method and system for training a machine learning model configured to perform characterization of components in a material stream with a plurality of unknown components. A training reward associated with each unknown component within the plurality of unknown components in the material stream is determined, based on which at least one unknown component is physically isolated from the material stream by means of a separator unit, wherein the separator unit is configured to move the selected unknown component to a separate accessible compartment. The isolated at least one unknown component is analyzed for determining the ground
(Continued)

truth label thereof, wherein the determined ground truth is used for training an incremental version of the machine learning model.

11 Claims, 8 Drawing Sheets

(51) Int. Cl.

| | |
|---|---|
| ***B09B 5/00*** | (2006.01) |
| ***G06V 10/58*** | (2022.01) |
| ***G06V 10/70*** | (2022.01) |
| ***G06V 10/776*** | (2022.01) |
| ***G06V 20/40*** | (2022.01) |

(52) U.S. Cl.
CPC .......... *G06V 10/774* (2022.01); *G06V 10/776* (2022.01); *G06V 20/40* (2022.01)

(58) Field of Classification Search
CPC .. G06V 10/774; G06V 10/776; G06V 10/454; G06V 10/82; G06T 2207/20081; G06T 2207/20084; G06N 3/0464; G06N 3/04; G06N 20/00
See application file for complete search history.

(56) References Cited

U.S. PATENT DOCUMENTS

| | | | |
|---|---|---|---|
| 2012/0148018 A1 | 6/2012 | Sommer, Jr. et al. | |
| 2015/0254833 A1 | 9/2015 | Deng et al. | |
| 2017/0152104 A1 | 6/2017 | Grochowina | |
| 2017/0328845 A1 | 11/2017 | Loeffler et al. | |
| 2018/0243800 A1* | 8/2018 | Kumar | B07C 5/3416 |
| 2018/0318882 A1 | 11/2018 | Rem et al. | |
| 2018/0354121 A1 | 12/2018 | Sezaki | |
| 2019/0030571 A1 | 1/2019 | Horowitz et al. | |
| 2019/0047024 A1 | 2/2019 | Bourely et al. | |
| 2019/0217342 A1 | 7/2019 | Parr et al. | |
| 2020/0050922 A1* | 2/2020 | Wu | G06N 3/045 |
| 2021/0287357 A1* | 9/2021 | Horowitz | G06V 20/52 |
| 2022/0262104 A1* | 8/2022 | Salman | G06F 18/2155 |

FOREIGN PATENT DOCUMENTS

| | | | | |
|---|---|---|---|---|
| CN | 104299315 | A | * | 1/2015 |
| CN | 110503161 | A | | 11/2019 |
| CN | 110513161 | A | | 11/2019 |
| DE | 4305006 | A1 | | 9/1993 |
| DE | 202015000612 | U1 | | 5/2015 |
| JP | H11226508 | A | * | 8/1999 |
| JP | 2017109197 | A | | 6/2017 |
| JP | 2019195751 | A | | 11/2019 |
| JP | 6679188 | B1 | | 4/2020 |
| WO | 2011159269 | A1 | | 12/2011 |
| WO | 2016097014 | A1 | | 6/2016 |
| WO | 2017106778 | A1 | | 6/2017 |
| WO | 2017220079 | A1 | | 12/2017 |
| WO | 2018028752 | A1 | | 2/2018 |
| WO | 2018200866 | A1 | | 11/2018 |
| WO | 2019023545 | A2 | | 1/2019 |
| WO | 2019056102 | A1 | | 3/2019 |
| WO | 2019089825 | A1 | | 5/2019 |

OTHER PUBLICATIONS

Lukka et al. "Zenrobotics recycler-robotic sorting using machine learning"; Proceedings of the international conference on sensor-based sorting (SBS); No. 1; Citeseer (Lukka et al.) (hereinafter Lukka) (Year: 2014).*

XP055551300, Sathish Paulraj Gundupalli; Hait Subrata; Thakur Atul, "A review on automated sorting of source-separated municipal solid waste for recycling", Waste Management, Feb. 1, 2017 Elsevier, New York, NY, US—ISSN 0956-053X, vol. 60, pp. 56-74.

XP055551303, Dr Tuomas; Lukka J Timo; Tossavainen Dr; Janne V; Kujala Dr; Tapani Raiko; Zenrobotics Ltd; Vilhonkatu; Helsinki A; Finland, "ZenRobotics Recycler—Robotic Sorting using Machine Learning".

International Search Report and Written Opinion—PCT/EP2021/059942—mailing date Oct. 21, 2021.

Article—Waste sorting, robotics and artificial intelligence, techniline by Sirrus, dated Jan. 10, 2020.

* cited by examiner

METHOD AND SYSTEM FOR TRAINING A MACHINE LEARNING MODEL FOR CLASSIFICATION OF COMPONENTS IN A MATERIAL STREAM

CROSS-REFERENCE TO RELATED APPLICATIONS

This application is a U.S. National Stage application under 35 U.S.C. § 371 of International Application PCT/EP2021/059942 (published as WO 2021/209614 A1), filed Apr. 16, 2021 which claims the benefit of priority to Application EP 20169824.8, filed Apr. 16, 2020. Benefit of the filing date of these prior applications is hereby claimed. Each of these prior applications is hereby incorporated by reference in its entirety.

FIELD OF THE INVENTION

The invention relates to a method and system for training a machine learning model configured to perform characterization of components in a material stream with a plurality of unknown components. The invention further relates to a computer program product.

BACKGROUND TO THE INVENTION

Effective data classification plays an increasingly important role in many applications. For instance, a computer vision application may apply a classifier or a statistical model (e.g. machine learning model, regression model) to captured images or video streams in order to recognize components or objects. To ensure reliable performance of the classifier, it must be trained using a plurality of labeled examples. Such systems often rely on human labor to manually label the data.

The characterization of one or more components in material streams has several important applications, for example in recycling processes, agricultural processes, food productions processes, etc. The characterization can for instance be used for quality control, value assessment, and process engineering and control. For example, for waste processing, conventionally many waste streams are sub-optimally recycled due to the lack of characterization data. There is a need for an adequate characterization technology for heterogeneous material streams (e.g. bulk solid waste streams).

Typically, material stream characterization involves manual inspection of objects by a person, e.g. plant personnel working at a special facility. This approach is slow, subjective and, expensive and eventually it delivers only little information about the particles in the material stream. In some conventional methods, samples are taken and tested/analyzed for instance in a laboratory. This process can take up too much time (chemical analysis make take days, weeks to months), and may result in increased costs. Furthermore, only a small fraction of the total amount of components/materials/objects in the material stream are characterized. Typically, many material streams are sub-optimally identified because the quality of the materials is difficult to measure. There is a need for a fast, objective and/or automated method that delivers data on a more detailed level. One example of characterization of material streams is waste characterization.

A machine learning model is a statistical classifier which can be trained using large amounts of data which can be labeled by humans and/or experimentation. Such labeling can be a labor-intensive and/or expensive process. One of the bottlenecks in building an accurate statistical system is the time spent (manual) labeling in order to have high quality labeled data. Typically, samples to be labeled (cf. new data points) are chosen randomly so that the training data matches the test set.

Therefore, since determining a ground truth during training of machine learning models can be rather labor intensive and time-consuming in various cases and applications, there is a strong need for effectively obtain a well trained prediction model while reducing the effort and/or cost required therefor. It is desired to more efficiently obtain such prediction model.

SUMMARY OF THE INVENTION

It is an object of the invention to provide for a method and a system that obviates at least one of the above mentioned drawbacks.

Additionally or alternatively, it is an object of the invention to improve characterization of components in a material stream with a plurality of unknown components.

Additionally or alternatively, it is an object of the invention to improve the efficiency of training of a machine learning model, such as a component label prediction model.

Additionally or alternatively, it is an object of the invention to provide for improved waste processing.

Thereto, the invention provides for a method for training a machine learning model configured to perform characterization of components in a material stream with a plurality of unknown components, the method comprising: scanning the material stream by means of a sensory system configured to perform imaging of the material stream with the plurality of unknown components; predicting one or more prediction labels and associated label prediction probabilities for each of the unknown components in the material stream by means of a machine learning model which is configured to receive as input the imaging of the material stream and/or one or more features of the unknown components extracted from the imaging of the material stream; determining a training reward associated with each unknown component within the plurality of unknown components in the material stream; selecting at least one unknown component from the plurality of unknown components in the material stream based at least partially on the training reward associated with the unknown components, wherein the selected at least one unknown component is physically isolated from the material stream by means of a separator unit, wherein the separator unit is configured to move the selected unknown component to a separate accessible compartment; analyzing the isolated at least one unknown component for determining the ground truth label thereof, wherein the determined ground truth label of the isolated at least one unknown component is added to a training database; and training an incremental version of the machine learning model using the determined ground truth label of the physically isolated at least one unknown component.

The training reward can be a prediction of the improvement of a (machine learning) model/classifier performance by adding one or more ground truth labels linked to components of the material stream to the database. The training reward can be a prediction of increase in a performance of the machine learning model, indicated by a performance indicator. Different performance indicators are possible, for example depending on the application. For instance, performance indicator can be accuracy, purity, yield, etc. Many different performance indicators or scores can be used.

By isolating the selected components from the material stream, an analysis can be performed for determining the ground truth label. This knowledge can be fed back to the machine learning model during a training process. In this way, the accuracy of the incrementally trained machine learning model can be enhanced. One or more of the components in the material stream can be selected which would, if labeled for ground truth determination, maximally improve the performance and/or accuracy of the classification (cf. prediction of labeling) by the machine learning model. The system can select and physically isolate those components which would provide more learning improvement of the model than the other components in the material stream.

The manual/experimental effort for training the machine learning model can be effectively reduced through the combination of active, semi-supervised and unsupervised learning techniques. The system includes a separator unit for physically isolating one or more unknown components for further analysis. The selection of the one or more unknown components can be carried out by using confidence scores, prediction probabilities, entropy, density in feature space, etc.

The machine learning model may employ active learning for training. The machine learning model can be seen as a learner which can actively select learning data. The physical active learning may include means for physically isolating selected components in the material stream to be analyzed for providing the selected learning data. In the active learning, a cycle of experimenting, learning of results, and selection of components of next experiment is repeated, thereby enabling the reduction in a total amount of experiments. The learning of results and selection of components of the next experiment are carried out by the computer. The system has a separator unit to physically isolate the selection of components from the material stream. Many results can be obtained from small number or amount of experiments. The physical active learning can be employed in an experimental design to design appropriately experiments for analyzing components in the material stream, which experiments may require a lot of cost, a lot of effort, and/or a long time.

Optionally, the machine learning model is configured to receive as input one or more user-defined features of the unknown components extracted from the imaging of the material stream.

Optionally, user-generated selection criteria for the selection of components are employed.

Optionally, the separation unit comprises multiple subunits employing different separation techniques.

Optionally, the separation unit has at least a first subunit and a second subunit, wherein one of the first or second subunit is selected for physical isolation of the selected at least one unknown component based on the one or more features of the unknown components extracted from the imaging of the material stream.

Depending on certain properties of the unknown components, a suitable subunit of the separation unit can be used to separate the unknown component from the material stream. For example, different separation techniques may be needed depending on the mass, size, etc. of the unknown components. For instance, a paper may be better separated using fluid blowing means, and block of metal may be better separated using mechanical means. Since, the one or more features of the unknown components is extracted from the imaging of the material stream, this data is available and can be advantageously used for selecting a suitable subunit.

Optionally, the first subunit is used for physical isolation of smaller and/or lighter components in the material stream, and the second subunit being used for physical isolation of larger and/or heavier components in the material stream.

In some examples, a machine learning model can further control which separation technique is most appropriately used for physically isolating a selected unknown component from the material stream.

Optionally, the first subunit is configured to isolate components by directing a fluid jet towards the components in order to blow the components to the separate accessible compartment, and wherein the second subunit is configured to isolate components by means of a mechanical manipulation device.

Optionally, the mechanical manipulation device of the second subunit comprises at least one robotic arm.

Optionally, for each unknown component in the material stream data indicative of a mass is calculated.

Optionally, the components in the material stream are scanned by means of a sensory system including an X-ray sensor configured to perform multi-energy imaging for obtaining at least a lower-energy X-ray image and a higher-energy X-ray image. Segmentation of images obtained by means of the sensory system can be performed in order to separate one or more distinct objects in the images, wherein data indicative of an area of the segmented objects is determined. For each of the segmented objects, data indicative of an area density and data indicative of an atom number can be determined by analysis of the lower-energy X-ray image and the higher-energy X-ray image, the data indicative of the area density and atom number being determined by means of a model which is calibrated by performing multi-energy X-ray imaging with different materials with known area densities and atom numbers. For each of the segmented objects, data indicative of a mass may be calculated based on the data indicative of the area density and the data indicative of the area of each of the segmented objects.

Optionally, a resulting force induced by the fluid jet is adjusted based on the mass of the selected at least one unknown component.

Optionally, a value indicative of a difficulty for performing physical isolation of the unknown component from the material stream by means of the separation unit is determined and associated to each unknown component, wherein the selection of the at least one unknown component from the plurality of unknown components in the material stream is additionally based on the value of the difficulty for performing physical isolation of the unknown component from the material stream.

Ranking of difficulty of isolation may allow to vastly improve the efficiency of training the machine model. Separation of components which are difficult to separate from the material stream, may result in failure of ground truth analysis. In such cases, it may be too late to still select the other candidate unknown components for selection, resulting in reduced training performance. The invention allows to effectively prevent such situations by also taking the difficulty of separation into account. For example, the extent to which something obstructs the unknow component (e.g. things around) may play an important role in the difficulty in physically isolating the unknown component from the material stream. It may even influence the analysis, since other components may be attached thereto. In some examples, a prediction or estimation of an accuracy and/or purity of separation is determined based on which the at least one unknown component from the plurality of unknown components in the material stream is selected for physical isolation.

Optionally, a top number of unknown components are selected from the plurality of unknown components in the material stream based on the training reward associated with the unknown components, wherein a subset of the top number of unknown components is selected for physical isolation based on the value indicative of the difficulty for performing physical isolation by means of the separation unit.

Optionally, the training reward is calculated based on one or more reward indicators. However, it is also envisaged that the training reward is provided by a user (e.g. estimation based on expert knowledge).

It will be appreciated that a machine learning models or learning machines may be understood as computational entities that rely on one or more machine learning algorithms for performing a task for which they have not been explicitly programmed to perform. In particular, the machine learning models may be capable to adjust their behavior to their environment. In the context of component characterization and detection in material streams, this ability can be very important, as the material streams often face changing conditions and requirements. The systems can be configured to incorporate fresh incoming data such as to operate in real-time. The machine learning model knowledge can be incremented with new data points at any time. In batch mode, a large dataset can be collected, and the entire dataset can be processed at once. In incremental mode, the machine learning model can be incremented with new data points at any time (lightweight and adaptable).

Optionally, the incremental version of the machine learning model is periodically trained using data periodically obtained from the analysis of the ground truth label of the isolated at least one unknown component.

According to the invention, the number of training examples to be labeled can be significantly reduced by employing active learning. Accordingly, unlabeled examples are inspected, and the most informative ones are selectively samples with respect to a given cost function for a human (e.g. at least partially manual) and/or machine to label. Advantageously, the active learning algorithm may provide a way to effectively select the examples for (physical) labeling that will have the largest performance improvement.

In some examples, the next component to be analyzed is selected based on its distance from (clusters of) other components in the feature space. However, other techniques can also be used. For instance, a statistical approach can be employed, in which components are selected and isolated for analysis such that at least one statistical property of the future machine learning model (e.g. the learner variance) is optimized. In some examples, the selection of the components is performed based on a level of disagreement amount an ensemble of classifiers. It will be appreciated that other approaches are also envisaged for determining a training reward linked to each of the components identified in the material stream.

Optionally, the plurality of identified unknown components are divided into one or more clusters such that each cluster contains components having similar features and/or characteristics, wherein identified unknown components are assigned a training reward at least partially based on its distance from the one or more clusters.

The invention enables control of reward training by means of certainty prediction in a machine learning model e.g. with a neural network implementation. However, it will be appreciated that determining the training reward based on uncertainty/confidence of the prediction of the prediction label by the machine learning model is one possible implementation. Other implementations are also envisaged. In some cases, a component of the material stream can be observed which has never been processed before by the machine learning model. In such a case, the model may determine with fairly high certainty that it belongs to a certain classification (prediction label), while the component in fact belongs to a classification that the model has not yet observed. This may be overcome by analyzing clusters in the feature space instead of uncertainties of the components. If the component is far from all currently observed clusters in the feature space, then selection can be made based on the location of the component or distance of the component to the clusters. This can be seen as an anomaly or outlier detection.

Advantageously, diversity can be effectively taken into account during training of the machine learning model. For example, the physical active machine learning system can select new unknown components (i.e. unlabeled observations) that are diverse across all observed unknown components (i.e. unlabeled observations). In this manner, the (physical) active machine learning system can assemble a higher quality training set.

Clustering algorithms can be used to distinguish between different clusters, to see if the clusters are intrinsically different from each other. Components that are identified to lie deep in the cluster can have a low uncertainty, while particles that are farther from the core or in between several clusters can have a higher uncertainty. The training reward may be linked to the clusters such as to more accurately determine the clusters and their boundaries in one or more dimensions.

Optionally, the training reward is at least partially based on a confidence score.

A training score can be determined based on the uncertainty and diversity of each unlabeled data point linked to the identified components in the material stream. In some examples, data points with top n scores are selected in a batch, wherein n corresponds to a batch size. The batch size can be understood as a number of data points (cf. components) to be selected from an unlabeled material stream. The selected components can be isolated from other unlabeled components in the material stream for manual and/or experimental annotation.

It is possible to more efficiently train the machine learning model using physical active learning. The model can be trained from a selected set of unknown components of the plurality of unknown components in the material stream using experimentally-labeled data (e.g. manual determination, automatized determination) rather than manual/human labeled data.

In the active learning process, the machine learning model may be first trained using a first set of ground truth data. This first set may for instance be a small set which is manually generated or automatically generated by means of a model. Using the sensory system, the one or more unknown components from the plurality of unknown components may be recognized as candidates for providing training data. For example, training rewards (e.g. confidence measures) may be employed for predicting which candidates are currently recognized incorrectly by the machine learning model. For example, the selected one or more unknown components may correspond to cases which are likely to have recognition errors by the used (trained) machine learning model.

The one or more unknown components can then be physically isolated by a separator unit (e.g. robotic arrangement having one or more sensors for performing the isolation task) enabling further analysis for determining the ground truth. For example, a human can verify the isolated selected one or more unknown components manually. Additionally or alternatively, machines and/or other sensory devices can be used for experimentally determining the isolated selected one or more unknown components.

Optionally, multiple components are simultaneously selected and isolated at a single instance at a time. This is relevant in cases where there is a weak correlation between feature and target (label/dependent variable) space. Optionally, the selection of the multiple components for isolation is based on their predicted label by the machine learning model.

Optionally, the plurality of identified unknown components are ordered as candidates for selection based on the training reward in order to yield a selectively sampled order, wherein a top number of identified unknown components from the selectively sampled order are isolated and analyzed for determining the ground truth label thereof based on which the incremental version of the machine learning model is trained.

Optionally, the machine learning model is configured to employ a pool-based active learning, wherein the machine learning model is exposed to a pool of unlabeled data points linked to the identified components in the material stream, wherein the machine learning model is configured to iteratively select one or more components of the plurality of components in the material stream for at least partially manual and/or at least partially automatic (e.g. using measurement devices) annotation for determining the ground truth.

Optionally, the separate accessible compartment enables a manual removal of the isolated unknown component, wherein an indication of an internal reference of the machine learning model is provided for the isolated unknown component within the separate accessible compartment, wherein the analysis of the at least one selected unknown component is performed at least partially by human annotation.

Optionally, the machine learning model is serial query based, wherein a single component is selected and isolated for further analysis at a time.

Optionally, the machine learning model is batch mode based, wherein a batch of components are selected and isolated for (e.g. simultaneous) analysis before updating the machine learning model.

Optionally, the isolated unknown component is analyzed by means of an analyzing unit.

Optionally, the analyzing unit is arranged to perform a characterization of the isolated unknown component within the separate accessible compartment for determining the ground truth label based on the characterization. In some examples, the isolated unknown component can be analyzed automatically by means of the analyzing unit.

Optionally, the analyzing unit is configured to perform chemical analysis on isolated components for determining the ground truth label at least partially based thereon.

Optionally, the analyzing unit is configured to perform destructive measurements on isolated components for determining the ground truth label at least partially based thereon.

Optionally, the analyzing unit is configured to perform at least one of: an energy or wavelength dispersive X-ray fluorescence (XRF) spectrometry, fire assay, inductively coupled plasma optical emission spectrometry (ICP-OES), inductively coupled plasma atomic emission spectroscopy (ICP-AES), inductively coupled plasma mass spectrometry (ICP-MS), laser-induced breakdown spectroscopy (LIBS), (near) infra-red (NIR) spectroscopy, hyperspectral spectroscopy, x-ray diffraction (XRD) analysis, scanning electron microscopy (SEM), nuclear magnetic resonance (NMR), Raman spectroscopy, or the like. A combination of measurement techniques may also be employed for determining the ground truth.

The analyzing unit may be configured to perform measurements in offline mode with respect to the sensory system. The analyzing unit may also be configured to operate in batch processing mode for determining the ground truth label of the isolated objects. In some examples, the analyzing unit is configured to perform measurements in near real time, with a certain time delay (e.g. a couple of minutes). It will be appreciated that in some examples, the analyzing unit may also be configured to provide relatively fast feedback, for example operate in real-time or quasi real-time (e.g. online measurements).

In some examples, the analyzing unit may be configured to perform deferred measurements (e.g. non-real-time).

Optionally, the analyzing unit is configured to perform discontinuous, periodic, and/or intermittent measurements for determining the ground truth of selected objects. The measurement technique performed by the analyzing unit may require an extended, ongoing, or relatively long-term measurement process.

The one or more measurement techniques employed by the analyzing unit may require preparatory steps which can be time-intensive and/or at least partially destructive. In some examples, the one or more measurement techniques are not performed in real-time. The employed measurement technique may be relatively expensive and/or require human effort.

Optionally, the analyzing unit performs non-imaging measurements. In some examples, the analyzing unit does not perform (optical) imaging techniques, for example not producing images. For example, the analyzing unit may be configured to perform measurements based on chemical analysis.

Optionally, the sensory system includes an X-ray sensor configured to perform multi-energy imaging for obtaining at least a lower-energy X-ray image and a higher-energy X-ray image, wherein images obtained by means of the sensory system are segmented in order to separate one or more distinct unknown components in the images, wherein data indicative of an area of the segmented objects is determined, wherein for each of the segmented unknown components, data indicative of an area density and data indicative of an atom number and/or a chemical composition are determined by analysis of the lower-energy X-ray image and the higher-energy X-ray image, the data indicative of the density and atom number being determined by means of a model which is calibrated by performing multi-energy X-ray imaging with different materials with known area densities and atom numbers, wherein for each of the segmented unknown components, data indicative of a mass is calculated based on the data indicative of the area density and the data indicative of the area of the segmented objects.

Optionally, the X-ray sensor is a dual energy X-ray sensor.

Optionally, the sensory system further includes a depth imaging unit for determining data indicative of a volume of segmented objects.

Optionally, the depth imaging unit includes at least one of a three-dimensional laser triangulation unit or three-dimensional camera.

Optionally, the sensory system further includes a color imaging unit configured to take color images of the segmented objects.

Optionally, data from different subsystems of the sensory system is aligned prior to determining characterizing features for each of the one or more segmented objects.

Optionally, for each of the one or more segmented objects further characterizing features relating to at least one of a volume, dimension, diameter, shape, texture, color, or eccentricity are determined.

Optionally, the material stream is moved on a conveyor, wherein the material stream is scanned by means of the sensory system for characterization of objects in the material stream.

Optionally, characterizing features of the one or more segmented objects are stored in order to build a digital twin model.

Optionally, the material stream is characterized prior to transportation for determining a first digital identification marker, wherein subsequently after transportation to a remote location, the material stream is characterized for determining a second digital identification marker, wherein the first and second digital identification markers are compared with respect to each other in order to determine change of contents during transportation.

Optionally, the material stream is non-homogeneous.

Optionally, the material stream is selected from a group consisting of solid waste, produced products, agricultural products, or batteries.

Typically, the conventional approach to object/component characterization in a material stream is manual inspection of objects by a person. This is often done in waste streams. Furthermore, often this is performed by superficial visual inspection of too small and therefore non-representative samples. Besides this task being tedious and time-intensive, its subjective nature implies that the resulting conclusions may not always be reliable. With quality control being an important purpose of component characterization in a material stream (e.g. waste stream), this hampers the transition to a more circular economy, as the variable quality of secondary materials strongly decreases market interest. The invention provides for a fast, objective and accurate automated method that utilizes data on a much more detailed level. An automated inspection is performed by means of artificial intelligence (AI), shifting the component characterization of the material stream towards a data-driven and automated approach.

Optionally, the machine learning model is an on-line or continuous learning model which is configured to update on each new analysis of the selected isolated unknown component (cf. sample). The analysis may for instance be performed by classification by a user (e.g. at least partially manual), or fully automated using an analysis unit (e.g. experimental determination). A combination of automated and manual analysis for determining the ground truth label is also envisaged.

Optionally, a deep learning machine learning model is employed. It will be appreciated that deep learning is a class of machine learning techniques employing representation learning methods that allows a machine to be given raw data and determine the representations needed for data classification. Deep learning can ascertain structure in data sets using backpropagation algorithms which are used to alter internal parameters (e.g., node weights) of the deep learning machine model. Deep learning machines can utilize a variety of multilayer architectures and algorithms Deep learning in a neural network environment can include numerous interconnected nodes referred to as neurons. Input neurons, activated from an outside source, activate other neurons based on connections to those other neurons which are governed by the neural network parameters. A neural network can behave in a certain manner based on its own parameters. Training a deep learning model refines the model parameters, representing, the connections between neurons in the network, such that the neural network behaves in a desired manner (better in the task for which it is intended, e.g. classifying components in material stream).

Deep learning operates on the understanding that many datasets include a hierarchy of features—from low level features (e.g. edges) to high level features (e.g. patterns, objects, etc.). While examining an image, for example, rather than looking for an object, a model starts to look for edges which form motifs which form parts, which form the object being sought. Learned observable features include objects and quantifiable regularities learned by the machine learning model. A machine learning model provided with a large set of well classified data is better equipped to distinguish and extract the features pertinent to successful classification of new data.

Optionally, the machine learning model utilizes a convolutional neural network (CNN). In some examples, deep learning can utilize a convolutional neural network segmentation to locate and identify learned, observable features in the data. Each filter or layer of the CNN architecture can transform the input data to increase the (feature) selectivity and robustness of the data. This abstraction of the data allows the machine to focus on the features in the data it is attempting to classify and ignore irrelevant background information. Deep learning machine models using convolutional neural networks (CNNs) can be used for image analysis.

According to an aspect, the invention provides for a system for training a machine learning model which is configured to perform characterization of components in a material stream with a plurality of unknown components, the system including a processor, a computer readable storage medium, a sensory system, and a separator unit, wherein the computer readable storage medium has instructions stored which, when executed by the processor, result in the processor performing operations comprising: operating the sensory system to scan the material stream such as to perform imaging of the material stream with the plurality of unknown components; predicting one or more labels and associated label probabilities for each of the unknown components in the material stream by means of a machine learning model which is configured to receive as input the imaging of the material stream and/or one or more features of the unknown components extracted from the imaging of the material stream; determining a training reward associated with each unknown component within the plurality of unknown components in the material stream; selecting at least one unknown component from the plurality of unknown components in the material stream based at least partially on the training reward associated with the unknown components; operating the separator unit for physically isolating the selected at least one unknown component from the material stream, wherein the separator unit is configured to move the selected unknown component to a separate accessible compartment; receiving for the isolated at least one unknown component the ground truth label determined by performing an analysis, wherein the determined ground truth label of the isolated at least one unknown component is added to a training database; and training an incremental version of the machine learning model using the determined ground truth label of the physically isolated at least one unknown component.

The method for selecting particular components in the material stream to be included in a training set can be based on an estimate of the 'reward' gained by including each identified component in the training set (estimate of performance increase). Then, the selected particular components of the material stream can be isolated and analyzed, in order to further train the machine learning model. The reward can be based on an uncertainty associated with the unlabeled component in the material stream. However, it is also possible to base the training reward to identified clustering of components in a feature space.

Active learning is a specific area of machine learning in which an algorithm is able to interactively query the information source to obtain a desired output (e.g., at least one of material properties, type of material, material characteristics, chemical analysis, color, shape properties, mass, density, etc., and the like) for a new data point. In the physical active learning provided by the invention, a separator unit is used to physically isolate one or more selected unknown components in the material stream for further analysis providing the one or more new data points. The physical active learning model is able to determine the measurement to make, according to a training reward (e.g., a weighted score) indicating an 'optimality' of the input data point. In some examples, this training reward may be determined and/or computed only with input data information.

Optionally, a user (e.g. expert or operator) can impose additional criteria on the selection of components for isolation and analysis. In some examples, the training reward is not always calculated, but it can also be assumed by a user. Components may be selected for isolation and analysis for determining the ground truth for training the machine learning model based on predetermined assumptions (e.g. experience/knowledge based). The physical isolation of components in material stream can for instance be performed at least partially based on properties of the components (e.g. shape, density, . . . ).

In some examples, the sensory system includes one or more imaging modalities, such as a 2D-camera, a 3D-camera, an X-ray imaging system, etc. It is also possible to use other imaging modalities, such as a computed tomography (CT) system, a magnetic resonance imaging (MRI) system, etc. A combination of imaging modalities is also possible. For instance, a 3D-camera system can be combined with an X-ray system.

According to an aspect, the invention provides for a method and a system having means to selectively isolate one or more components in a material stream for further analysis to determine a ground truth label, wherein the one or more components are selected based on its specific characteristics, and wherein the ground truth labels are used for active learning training of a machine learning model used for obtaining a prediction label for each of the components in the material stream. In some examples, the selection of the one or more components for isolation and further analysis for ground truth determination can be based on selection criteria, for instance provided by a user (e.g. selection of components with high density, components with some visual characteristics such as color, components with certain shapes, etc.). For example, an expert can estimate whether determining the ground truth for the selected components will provide the model with a larger training reward. Advantageously, a sensor-based separation device can be obtained which provides physical isolation of selected components used for training the machine learning model.

Instead of learning from randomly selected examples (passive learning), a machine learning model can act on the examples to be labeled, which can be seen as active learning. Using active learning, it is possible to get better performances using a subset of the training data. The invention employs a physical active learning in which a separator unit is provided arranged for physically isolating components from the material stream.

It will be appreciated that the machine learning model may use processing power of computers to execute algorithms to learn predictors of behavior or characteristics of data. Machine learning techniques may execute algorithms on a set of training samples (a training set) with a known class or label, such as a set of components known to exhibit particular properties/features, to learn characteristics that will predict the behavior or characteristics of unknown things, such as whether the unknown components belong to a certain class or group.

It will be appreciated that labeling can be performed in different ways and by different entities. For example, labeling may be performed by the machine learning model (i.e. providing a prediction label). Furthermore, on the other hand, labeling can also be performed for determining the ground truth label (e.g. carried out by an analyzed, human annotator, experimental set-up, etc.).

It will be appreciated that the training reward can be seen as a learning reward or active reward. It can be understood as a prediction and/or indication for how well that performance would increase if it were labeled with ground truth and used for training the machine learning model. The training reward can be indicative of an improvement of the machine learning model by training using the determined ground truth label associated with the selected component of the material stream. The training reward can be understood as an learning reward in a machine learning process.

It will be appreciated that various active learning techniques can be implemented. The active learning techniques may be configured to choose actions which will provide a maximal gain in knowledge or "know-how" in selecting training sets. The active learning techniques may differ with regard to the manner in which "knowledge" and gains in knowledge are quantified. They may also differ with regard to the way in which it is decided which action is liable to result in the maximal gain in knowledge. Many variant implementations are possible.

It will be appreciated that any of the aspects, features and options described in view of the method apply equally to the system and the described recycling device. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

In supervised machine learning, the model is trained on (large) material streams in which each object is accompanied by a label. The labels can denote respective material classes (e.g. metal, wood, glass, ceramics, . . . ) of the components/objects identified in the material stream, and can be used by the machine learning model to learn how components/objects in the material stream are to be classified correctly. Determination and/or preparation of this labeled data often turns out to be the bottleneck of a training process: meticulously selecting thousands of individual components/particles from a heterogeneous material stream can be a time-consuming and expensive endeavor. Hence, while unlabeled data from material streams can be abundantly available and easily acquired, labeled data can be scarce and difficult to obtain. Furthermore, the entire labeling process may have to be repeated from start to finish each time a new material stream is considered. The invention employs a data-driven characterization of components in the material stream in which the labeling cost is strongly reduced while substantially retaining an accuracy that is comparable with supervised models which use the entire training dataset. By employing active learning, the machine learning model itself can selects a small optimal subset of components (cf. objects, particles) in the material stream that require labeling. Training the machine learning model exclusively on this small labeled subset then results in a model performance that can compete with the scenario in which the model would have been trained on the entire stream of components in the material stream.

Figure 1:
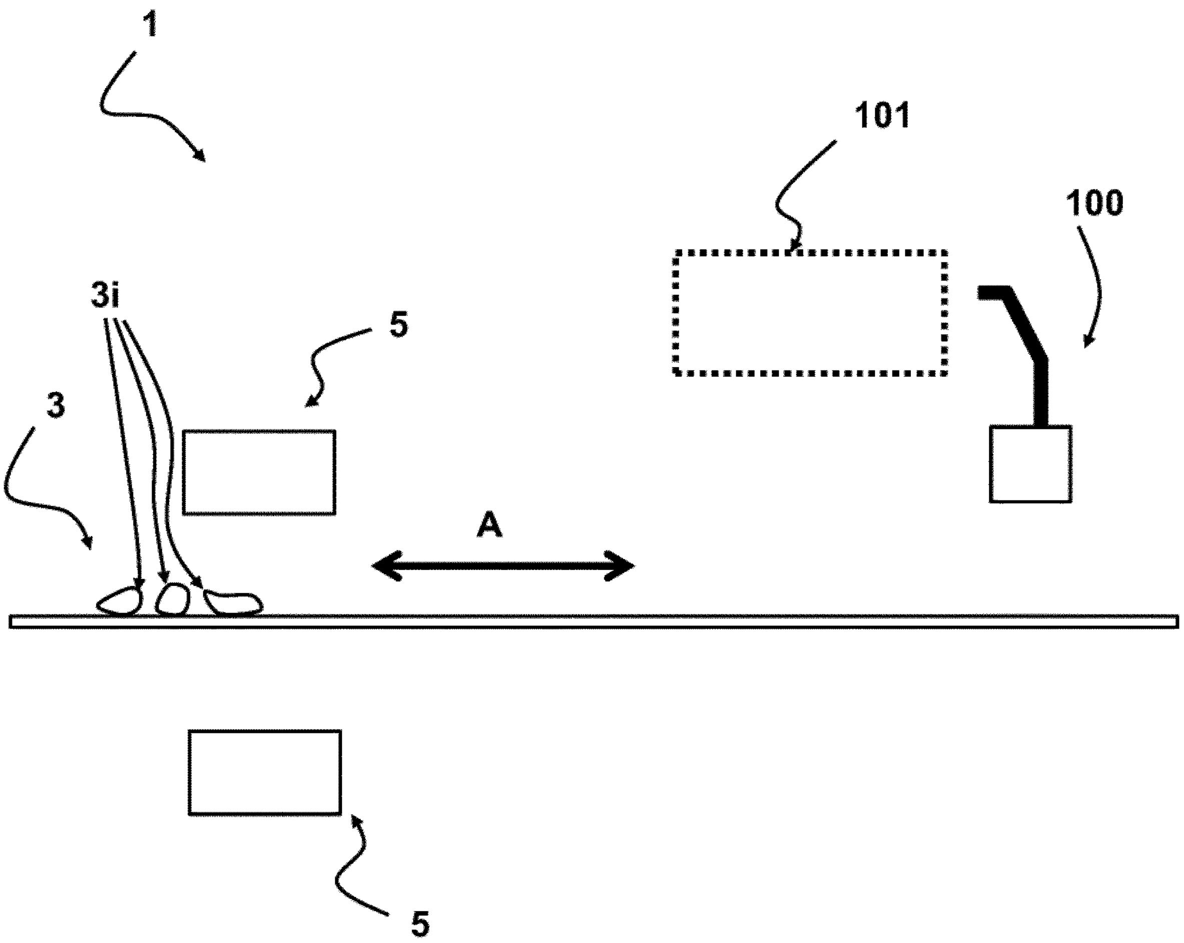
FIG. 1 shows a schematic diagram of an embodiment of a system.

FIG. 1 shows a schematic diagram of an embodiment of a system 1 for training a machine learning model which is configured to perform characterization of components in a material stream 3 with a plurality of unknown components 3*i*. The system 1 includes a processor, a computer readable storage medium, a sensory system 5, and a separator unit 100, wherein the computer readable storage medium has instructions stored which, when executed by the processor, result in the processor performing operations comprising:

operating the sensory system 5 to scan the material stream 3 such as to perform imaging of the material stream 3 with the plurality of unknown components 3*i*;

predicting one or more labels and associated label probabilities for each of the unknown components 3*i* in the material stream 3 by means of a machine learning model which is configured to receive as input the imaging of the material stream 3 and/or one or more features of the unknown components extracted from the imaging of the material stream 3;

determining a training reward associated with each unknown component 3*i* within the plurality of unknown components 3*i* in the material stream 3;

selecting at least one unknown component from the plurality of unknown components 3*i* in the material stream 3 based at least partially on the training reward associated with the unknown components 3*i*;

operating the separator unit 100 for physically isolating the selected at least one unknown component from the material stream 3, wherein the separator unit 100 is configured to move the selected unknown component to a separate accessible compartment 101;

receiving for the isolated at least one unknown component the ground truth label determined by performing an analysis, wherein the determined ground truth label of the isolated at least one unknown component is added to a training database; and training an incremental version of the machine learning model using the determined ground truth label of the physically isolated at least one unknown component.

In this exemplary embodiment, the separator unit includes a robotic arm for automatically isolating the selected components in the compartment 101. It will be appreciated that other means may also be employed for selectively moving the selected components from the material stream 3 to the compartment 101 for further analysis with regard to ground truth determination. This can be performed in different ways, for instance involving robotic means for performing physical separation. Various other techniques may also be employed. For instance, ejection of a selected component from the material stream can be achieved by means of an air jet (e.g. using air nozzles). A combination of techniques may also be used (e.g. depending on the size of the component to be separated/isolated from the material stream. For example, larger components may be physically isolated using a robotic arm, while smaller components can be isolated by means of fluid jets using fluid nozzles.

Due to the large amount of components in the material stream 3, it can be impractical for human beings to hand-label each component (large datasets). In order to optimize the labeling effort associated with training data classifiers, an active learning method is employed which selects only the promising and exemplar components for manual labeling. The selected components in the material stream are automatically physically isolated by means of the separator unit 100. In this example, a robotic arm is arranged. However, as mentioned above, one or more other means may also be employed.

The machine learning model may be an active learner applying a selection function to physically isolate a component for labeling. Based on the selection, the component can be isolated from the material stream 3 in the separate accessible compartment 101 for manual and/or experimental labeling to determine the ground truth. The machine learning model (cf. classifier) can be retrained with the newly labeled data and the process can continue, for example until a pre-defined stopping criterion is satisfied. Since the components to be labeled for training the machine learning model are selected and isolated based on the training reward, a time consuming process of retraining the classifier based on new data points can be avoided. Hence, the machine learning model can be trained more efficiently.

Figure 2:
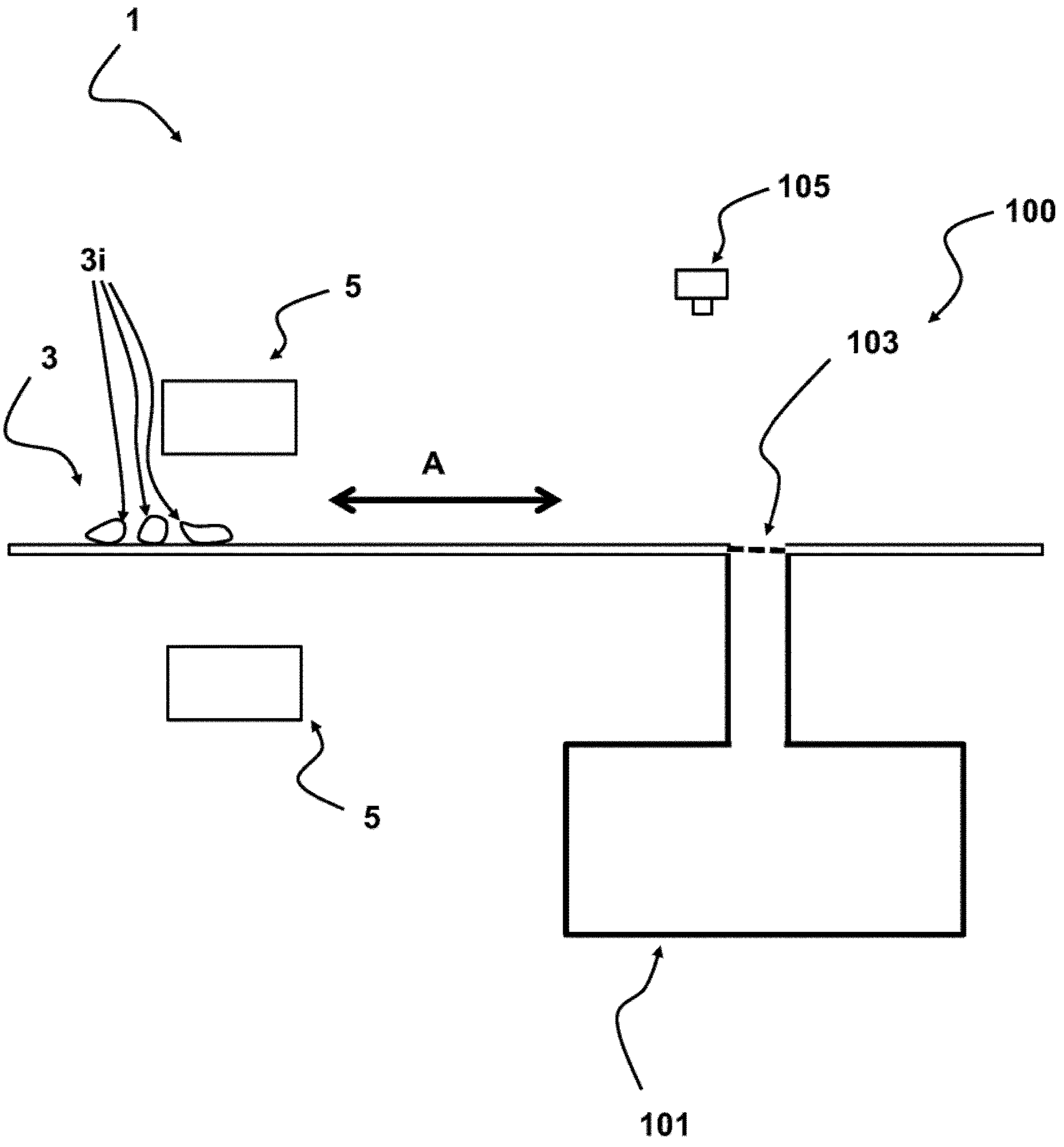
FIG. 2 shows a schematic diagram of an embodiment of a system.

FIG. 2 shows a schematic diagram of an embodiment of a system 1, similar to that shown in FIG. 1. In this embodiment, the separator unit 100 includes a operable lid 103 arranged in a path of the material stream 3. For example, the material stream may be transported by means of a conveyor belt at which the operable lid 103 may be arranged. The system may be configured to selectively open the lid 103 for isolating one or more components in the material stream 3. An optional optical unit 105 (e.g. camera) may be used for detecting when the lid 103 is to be opened for isolating the one or more components from the material stream 3. It will be appreciated that other variants are also possible, for instance not using an optical unit 105. The optical unit 105 may be optional, for instance, in some exemplary embodiments data from the sensory system 5 may be used for detecting when the lid 103 is to be opened for isolating the one or more components from the material stream 3. In some examples, the optional optical unit 105 may also be placed more upstream providing more reaction time when the lid 103 is to be opened.

The most appropriate data points linked to the identified components in the material stream can be selected for isolation and manual and/or experimental labeling to determine the ground truth. The resulting ground truth can then be used for further training the machine learning model. Since the selection is performed based on the training reward, a maximum generalization capability can be ensured of the machine learning model requiring minimum human labeling effort.

Figure 3:
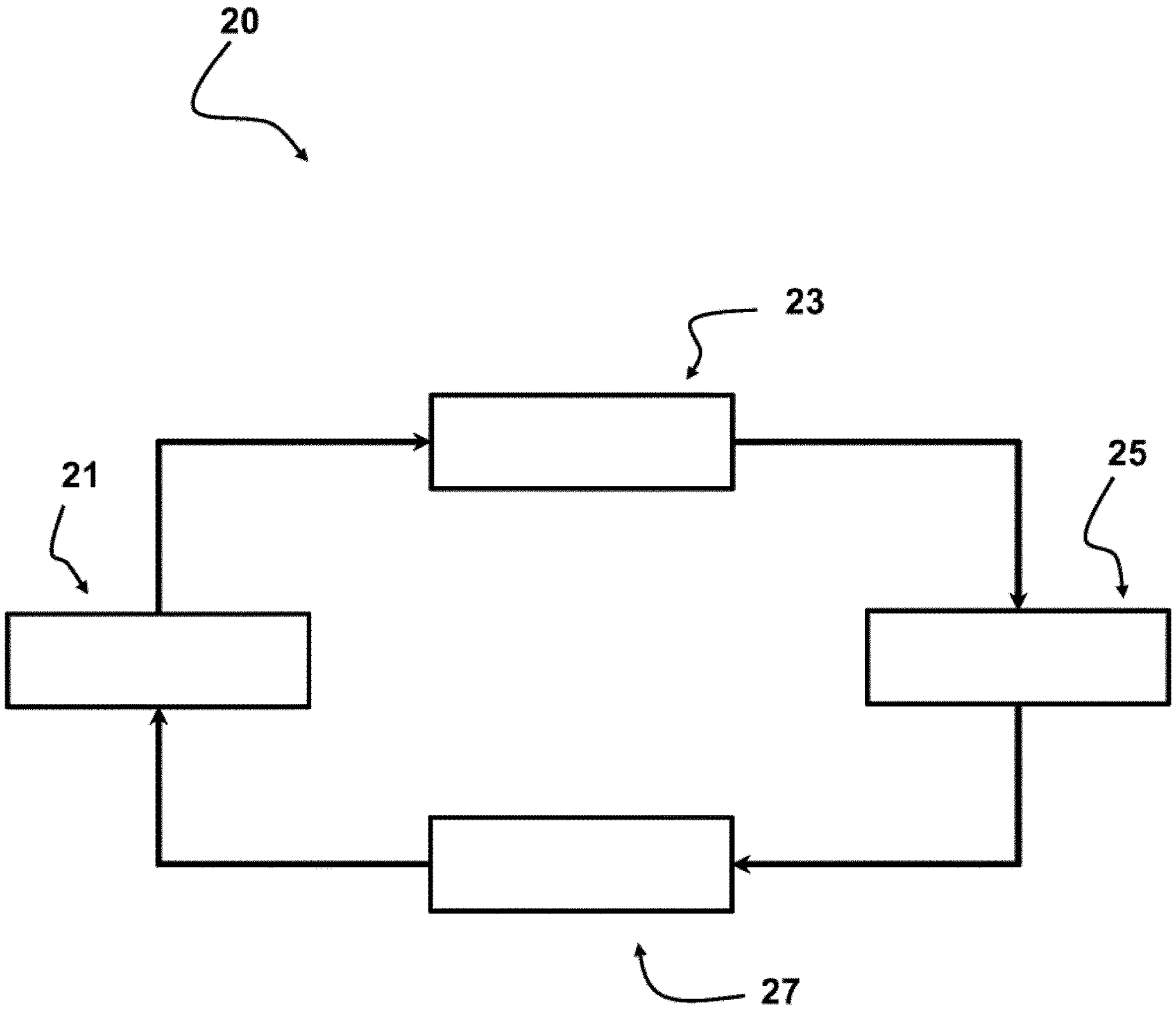
FIG. 3 shows a schematic diagram of an embodiment of a method.

FIG. 3 shows a schematic diagram of an embodiment of a method 20. The method may employ active machine learning in which a set of samples of the material stream 3 are selected for which it is desired to receive training data, rather than passively receiving samples chosen by an external entity. For example, as a machine learning model learns, the model can be allowed to select samples that the model determines will be most helpful for learning (relevance for training), rather than for instance relying only an external human expert or external system to identify and provide samples.

A pool-based active learning cycle is illustrated in FIG. 3. A labeled training set 21 may be used for training a machine learning model 23. The machine learning model can be presented with an unlabeled pool 25. The machine learning model may predict labels and training rewards associated with components in the material stream. Then, queries can be selected for analysis 27 (human annotation and/or experimentation). The selection may be based on training reward. The selected components can be physically separated for labeling. The results from analysis/labeling can be used a further training set (cf. labeled training set 21) for the machine learning model.

Active learning or query learning can overcome the labeling bottleneck of a training process by asking queries in the form of unlabeled instances to be labeled by an oracle, e.g. a human annotator and/or automatic analyzer. In this way, the active learner aims to achieve high accuracy using as few labeled instances as possible, thereby minimizing the cost of obtaining labeled data. Many query strategies exist. For example, a so-called pool-based active learning may be employed wherein the training data is divided in a (small) labeled dataset on the one hand and a large pool of unlabeled instances on the other hand. The active learner may operate in a greedy fashion: samples to be queried to the annotator may be selected by evaluating all instances in the unlabeled pool simultaneously. The component (cf. sample) that maximizes a certain criterion is sent to the oracle for annotation and added to the labeled training set, after which the classification algorithm can be re-trained on this set. The updated results from the model then allow the active learner to make a new selection of queries for the human annotator.

The active learner can employ one or more criteria for selecting a new component to be isolated and analyzed for annotation. Different approaches exist. In some advantageous embodiments, the query strategy employed is based on uncertainty sampling. The active learner queries the instances of the unlabeled pool about which it is least certain how to label. Let x be the feature vector describing a certain component in the unlabeled pool of components in the material stream. Under model θ, one can predict its material class, i.e. the particle's label, as the class with the highest posterior probability of all classes y:

$$\hat{y} \mid x = \arg\max_{y \mid x} P_\theta(y \mid x). \tag{1}$$

An exemplary query strategy would be to select the component whose prediction is the least confident, by computing the above equation (1) for all components in the unlabeled pool and choose one according to $$x^* = \arg\max_x (1 - P_\theta(\hat{y} \mid x)). \tag{2}$$

This criterion is equivalent to selecting the sample that maximizes the machine learning model's belief it will mislabel x, i.e. the sample whose most likely labeling is the least likely among the unlabeled components available for querying. A drawback is that the machine learning model only considers information about the most probable label and therefore throws away information about the rest of the posterior distribution.

An alternative sampling strategy that addresses the drawback described above is one that uses the Shannon entropy as an uncertainty measure:

$$x^* = \arg\max_x \mathcal{H}(y \mid x) = \arg\max_x -\sum_i P_\theta(y_i \mid x) \log P_\theta(y_i \mid x). \tag{3}$$

Here $y=(y1, \ldots, y6)^T$ is the vector containing the labels of all 6 classes as shown in the example of FIG. 1. Naturally other classes may also be used. As entropy is a measure of a variable's average information content, it is commonly used as an uncertainty or impurity measure in machine learning.

Figure 4:
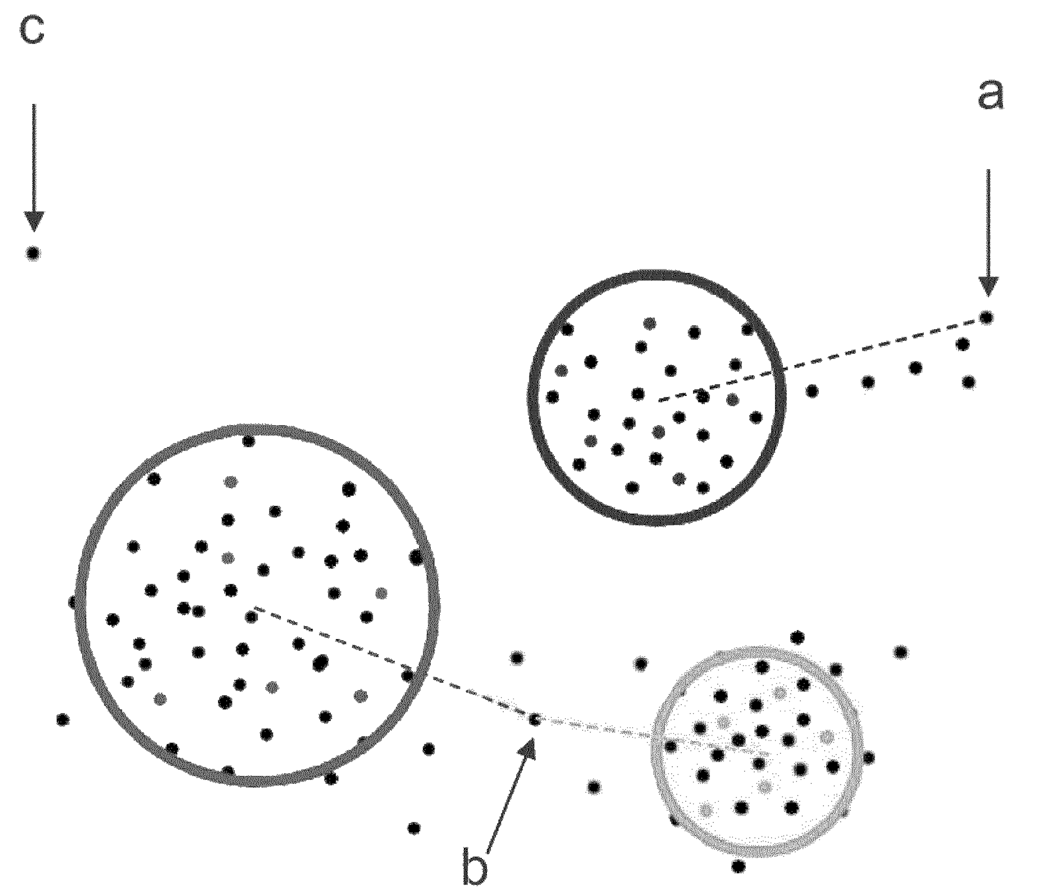
FIG. 4 illustrates an exemplary feature space.

FIG. 4 shows an exemplary feature space. The invention employs a physical active learning in which only those components/objects in a material stream are selected and isolated for determining a ground truth label subsequently used for further training of the machine learning model used for predicting the label linked to the components/objects in the material stream. In this way the machine learning model (e.g. classification model) can be trained more effectively using automated analysis of particular selected and isolated components/objects.

It can be far too labor-intensive to separately determine the ground truth label of each of the components afterwards. Advantageously, now the model can be trained very well with much less data. The system can automatically select and isolate the components in the material stream for further analysis in order to determine the ground truth label. This is for example very useful for waste processing involving one or more waste material streams. For instance, the system can be configured to perform waste characterization, wherein the system allows for efficient further training of the employed machine learning model. Additionally, in some examples, the system may also be configured to perform sorting of materials based on the waste characterization. It will be appreciated that the invention may also be used in other applications for characterization of other material streams.

Determining the ground truth can be established in different ways, for instance partially involving manual labeling (e.g. at least partially analyzed by a human). However, it can also be determined automatically, for example involving chemical experimentation. A combination of techniques can also be employed, for instance when different properties are to be determined for deriving the ground truth label, e.g. requiring different techniques. Different characterization parameters may be determined for determining the ground truth (e.g. mass, chemistry, weight, geometrical properties, etc.).

The material stream may be an heterogeneous flow of materials or components. Various algorithms and techniques may be used for determining which particle contributes most to training the machine learning model. Different active learning methods can be applied for this purpose.

Different strategies can be employed for choosing a next point for ground truth labeling (e.g. by means of an analysis). In the example shown in FIG. 4, the system is configured to operate the separator unit 100 to isolate one or more components (cf. sampling) which are selected for ground truth labeling based on a distance to clusters. Different techniques can be used, for instance including:

- Selecting the sample which is located the furthest away from all cluster centers. This allows to detect potential new (sub)classes.
- Selecting the sample that is located in between clusters (e.g. equal distance to two clusters). This allows to refine the decision between the classes.

Selecting the sample that is located the furthest away from the majority of the samples/clusters (i.e. isolated sample). This allows to identify outliers/anomalies that potentially represent a new (sub)class.

A combination of above techniques may also be used. It will be appreciated that other selection strategies can also be employed.

Figure 5:
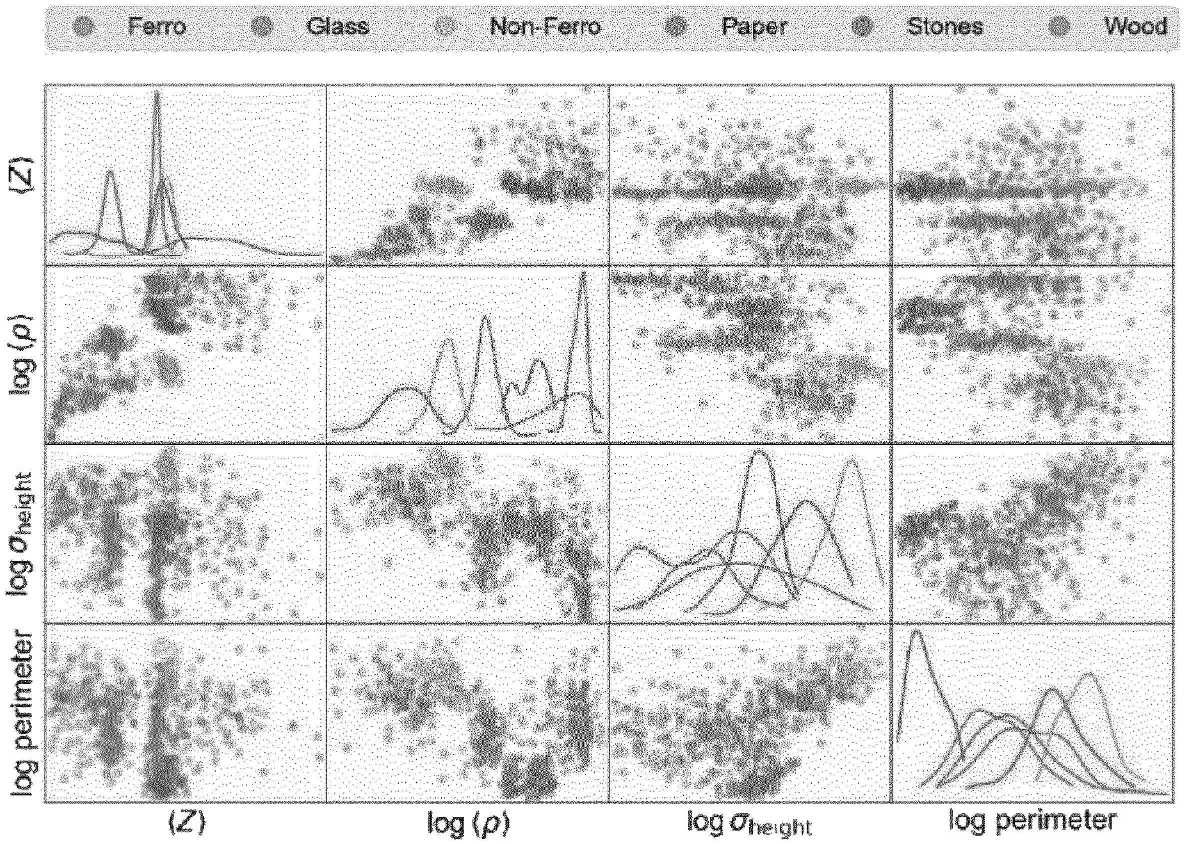
FIG. 5 shows distributions of features for different component classes.

FIG. 5 shows distributions of features for different component classes. The components 3*i* in the material stream 3 can be sorted into different classes: for example paper, wood, glass, stones, ferrous metals (ferro) and non-ferrous metals (non-ferro). Exemplary classes are provided in FIG. 5. The machine learning model can be a classification model that is configured to learn to differentiate between these different classes. The graphs shown in FIG. 5 represent univariate and bivariate distributions of four features. As expected, some features are better suited than others to discriminate between certain materials. For example, the atomic number is able to separate paper from non-ferrous metals well, but fails in distinguishing between stones and glass. This is the other way around for mean density. All exemplary features, 31 in total in this example, can be combined when training a classifier, thereby maximizing the learning potential.

The diagonal graphs represent kernel density estimates for the distributions of 4 features from the dataset. The off-diagonal graphs represent scatterplots of the respective features: mean atomic number <Z>, the logarithm of the mean density <ρ>, the logarithm of the standard deviation of the height o height and the logarithm of the perimeter of the components.

Selection and isolation of the components of the material stream for ground truth label analysis can be based on a level of confidence of the current machine learning model (cf. classifier) on the unlabeled identified components in the material stream.

Figure 6:
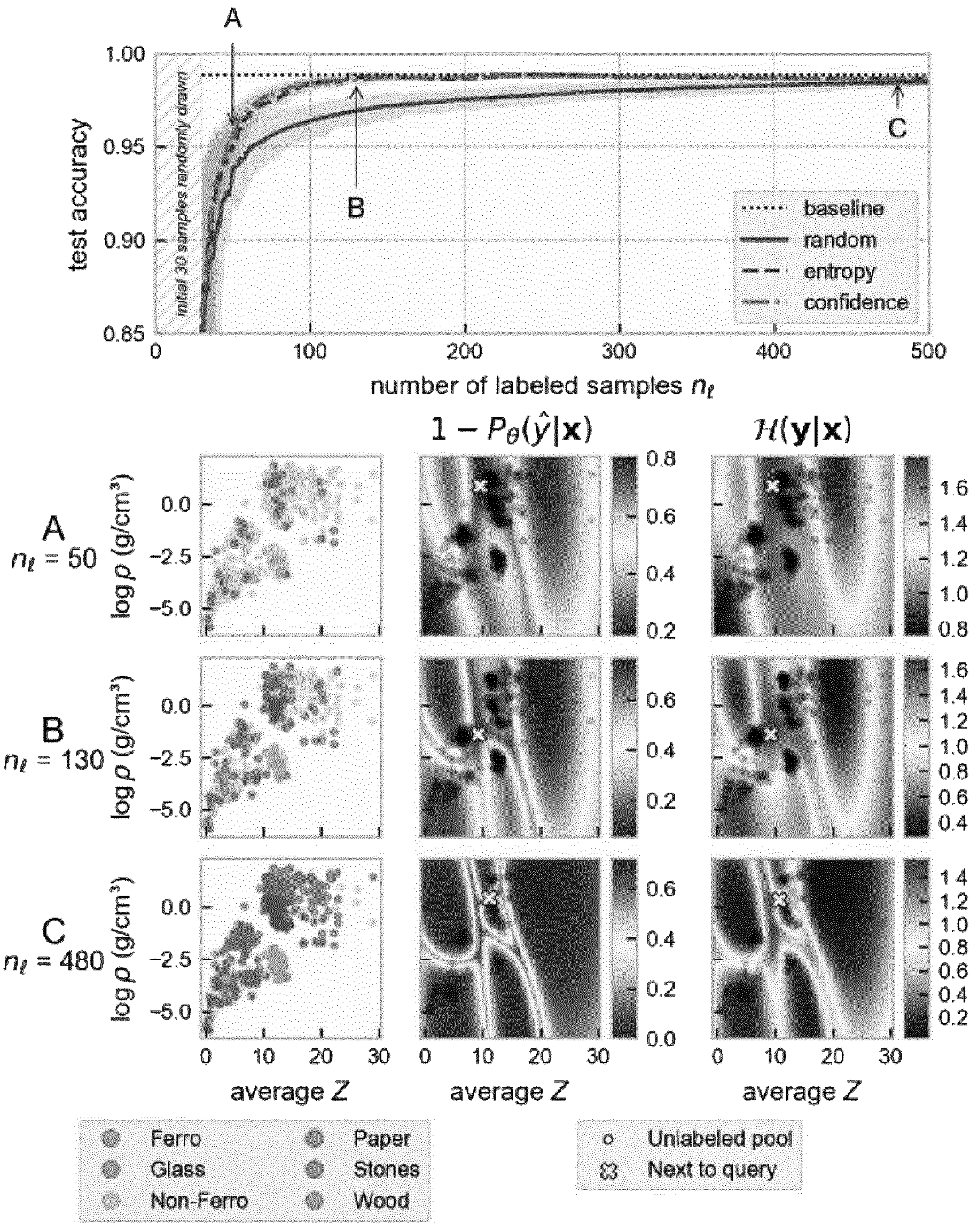
FIG. 6 illustrates exemplary learning process indicators.

FIG. 6 illustrates learning process indicators in different graphs. In the top panel of FIG. 6, learning curves of different exemplary models (random sampling and uncertainty sampling based on the least confidence and entropy criteria, cf. equations (2) and (3) respectively) are shown which employ different criteria for selecting a new component to be isolated and analyzed for annotation. These lines reveal how the test performance of each of the models changes as a function of the number of queried (cf. selected, isolated and analyzed for classification) components in the material stream 3, or, equivalently, the size of the labeled training set. In the example, the sample size was incremented with steps of one and a support vector machine (SVM) with radial basis kernel was used as a classifier.

The uncertainty sampling based on the confidence criterion as in equation (2) is compared to the entropy criterion as in equation (3) with random sampling. In the latter case components of the material stream are not queried based on some uncertainty criterion but completely randomly.

In general, it is expected the performance of any model to go up with the sample size, as more labeled data means more information. However, this does not happen at the same pace for all models. The graph indicates that results for entropy- and confidence based sampling techniques are comparable but random sampling clearly underperforms for classification of the components in the material stream. In the limit of large sample sizes, all model performances converge to the "optimal" value of the model that makes use of the entire training dataset. This performance is the one the active learning models are to compete with and is shown as the baseline accuracy of 0.988 in FIG. 6. As is clear from FIG. 6, more samples are needed to make smaller absolute gains as the performance of the active learner approaches the baseline accuracy. For example, uncertainty sampling requires 77 labeled instances to reach 99% of the baseline accuracy and 195 to reach 99.9% of the baseline accuracy, i.e. more the number of labeled samples needs to be more than doubled to make a mere 0.9 percentage point gain in accuracy. This raises an important issue in practical applications, which is the trade-off between the cost of labeling and the potential cost of making classification errors.

The lines show the mean results of 250 different random initial conditions, and the boundaries of the shaded regions are defined by the 10% and 90% quantiles. Furthermore, a cross section of the feature space spanned by the mean atomic number Z and density ρ at three different stages of the learning process is shown. The first column indicates which samples have been queried up until that point. The second and third columns show the behavior of the least confidence and entropy measures in this two-dimensional cross-section of the feature space. The remaining unlabeled samples are shown, and the one with highest uncertainty is indicated by a cross: this is the next component to be isolated and analyzed (e.g. by human annotator and/or experimentally).

Three locations have been indicated on the learning curves, which are further examined in the other graphs of FIG. 6. These show a cross-section of the 31-dimensional feature space spanned by the mean atomic number Z and the logarithm of the density ρ. The first column shows for each of the three stages of the learning process which samples have been labeled up to that point. At the start of the active learning process, samples are drawn more or less evenly in the space, which is also why the difference with the random model is not that large at this point.

However, when more data becomes available, the active learner starts to recognize the boundary regions between the different material classes, and primarily queries samples in the immediate vicinity of these class boundaries, as these are typically the particles with the highest classification uncertainty for the model. This can also be observed from the second and third columns in FIG. 6, which show the behavior of the confidence and entropy sampling criteria for a two-dimensional model, respectively. As more labeled training data is available, the boundaries separating the different material classes be-come more pronounced as regions with higher uncertainty. While the class boundaries appear to be smoother for the entropy than for the confidence criterion, the pattern for both measures is roughly the same. This explains why similar samples are queried and the performance of the two is roughly the same.

Generally, the optimal choice of uncertainty measure depends strongly on the dataset at hand. However, one could argue that the confidence criterion is possibly slightly more appropriate in the case where classification is simply performed by means of majority vote: a component is assigned to the class with the highest posterior probability. If however more complicated rules are used (e.g. in the case of imbalanced datasets), entropy is arguably the more obvious choice.

Figure 7:
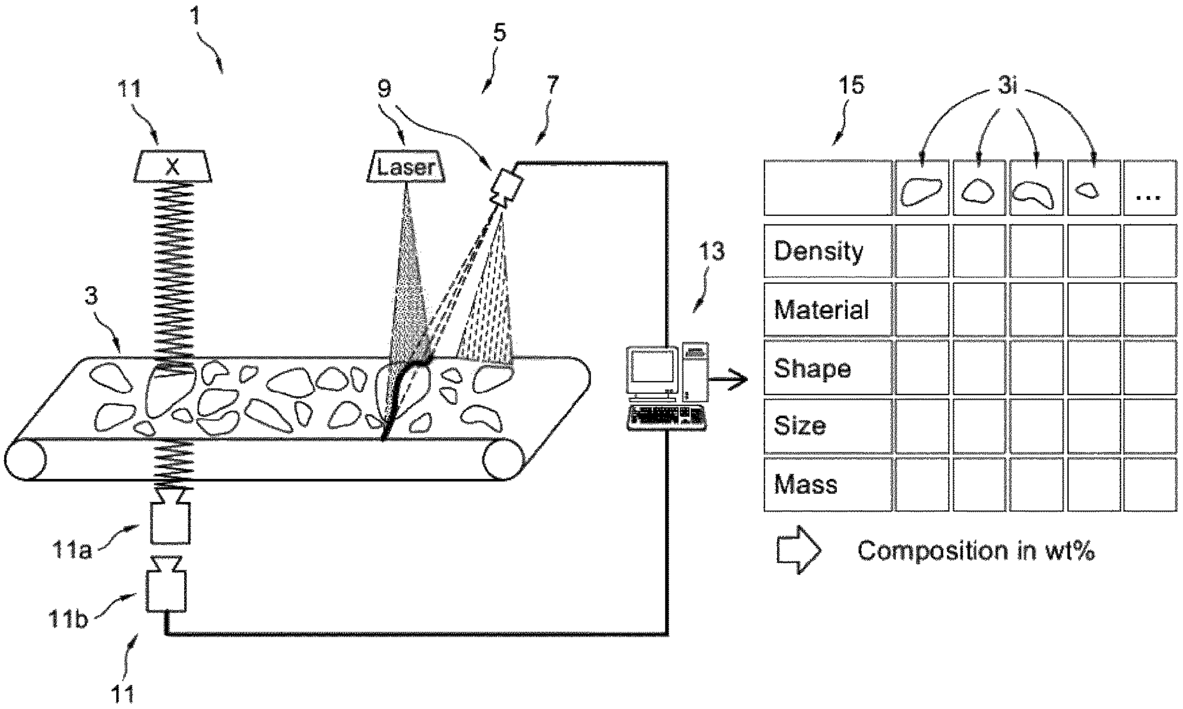
FIG. 7 shows a schematic diagram of a system.

FIG. 7 shows a schematic diagram of an embodiment of a system 1. In this example, at least one of an optional (color) camera 7 or optional 3D laser triangulation unit 9 are arranged in order to enable determining additional characteristics linked to each of the segmented objects. Hence, in some examples, next to features/characteristics relating to material type, mass, etc., it is also possible to make a distinction between the identified and/or segmented objects based on at least one of size, shape, color, texture, visual insights, etc. Such information may also enable virtual experimenting. In this example, the sensory unit 5 includes an X-ray sensor 11 having two X-ray sub-units 11*a*, 11*b* for performing dual-energy X-ray imaging. Furthermore, the camera 7 and 3D laser triangulation unit 9 are integrated in the sensory unit 5. In this way, the sensory unit 5 provides a plurality of images which can be aligned and/or fused, for instance by a computer unit 13. Aligning and/or fusing of the imaging data obtained from different camera's/detectors can enable a better determination of the features/characteristics of the segmented objects. The one or more materials are segmented and the individual segmented objects 3*i* are analyzed for determining relevant features/characteristics thereof. In this example, the following features 15 are determined for each segmented object: density, material, shape, size and mass. It will be appreciated that other sets of features are also possible. From the data it is also possible to derive a relative weight percentage of each of the segmented objects.

The system according to the invention can be faster and more autonomous in characterization of one or more materials, while requiring less (labor-intensive) input from humans. The system can provide important advantages in the application of waste characterization.

In order to develop a model that recognizes different (images of) waste particles and classifies them into different categories, a machine learning model can be trained by showing it a large number of images, each image accompanied by a label that describes what is in it. The conventional approach, in which all data is labeled in advance, is known as supervised learning. This labeled data represents the fuel of machine learning algorithms. For the waste characterization technology, labeled data can typically be generated by scanning physical "pure" mono-material streams, which are often manually prepared by meticulously selecting thousands of individual particles from a heterogeneous waste stream.

The characterization of waste has several important applications in the recycling industry. It can be used for value assessment. Fast and reliable value assessment of complete material streams decreases the risk of exposure to volatility of commodity stock markets. Further, it can be used for quality control. In a circular economy, it is desired that the quality of recycled products is guaranteed. The characterization technology helps to establish market trust. Further, it can be used for process engineering. The technical and economic feasibility of waste recycling processes and design of new processes by virtual experimenting can be assessed. Further, it can be used for online process optimization. Sorting processes can be measured, controlled and optimized on-the-fly.

In some examples, a direct, inline characterization technology can be provided that assess the materials both qualitatively (material type, chemistry, purity, . . . ) and quantitatively (mass balances, physical properties, . . . ). Such an in-line characterization system can be configured to assess heterogeneous and complex material streams completely, eliminating the need for subsampling. Moreover, mass-balances can be produced on-the-fly. In fact, for each material object, a digital twin can be created which can be further assessed in a virtual way.

The invention can provides for a data-driven material characterization using physical active learning that can strongly reduce the labeling effort when gathering training data. While conventional machine learning algorithms require a large and completely labeled dataset for training, it is observed that only a fraction of this data is required to make good predictions. Active learning allows to train the model on a small subset, chosen by the algorithm, and obtain an accuracy that is comparable with the one that is found by training the model on the complete dataset. In some examples, active learning allows to reduce the labeling cost by 70% while retaining 99% of the accuracy that would be obtained by training on the fully labeled dataset.

It will be appreciated that the system and method according to the invention can be used for different material streams. In some examples, the materials stream includes construction and demolition waste. However, other waste streams can also be used.

Figure 8:
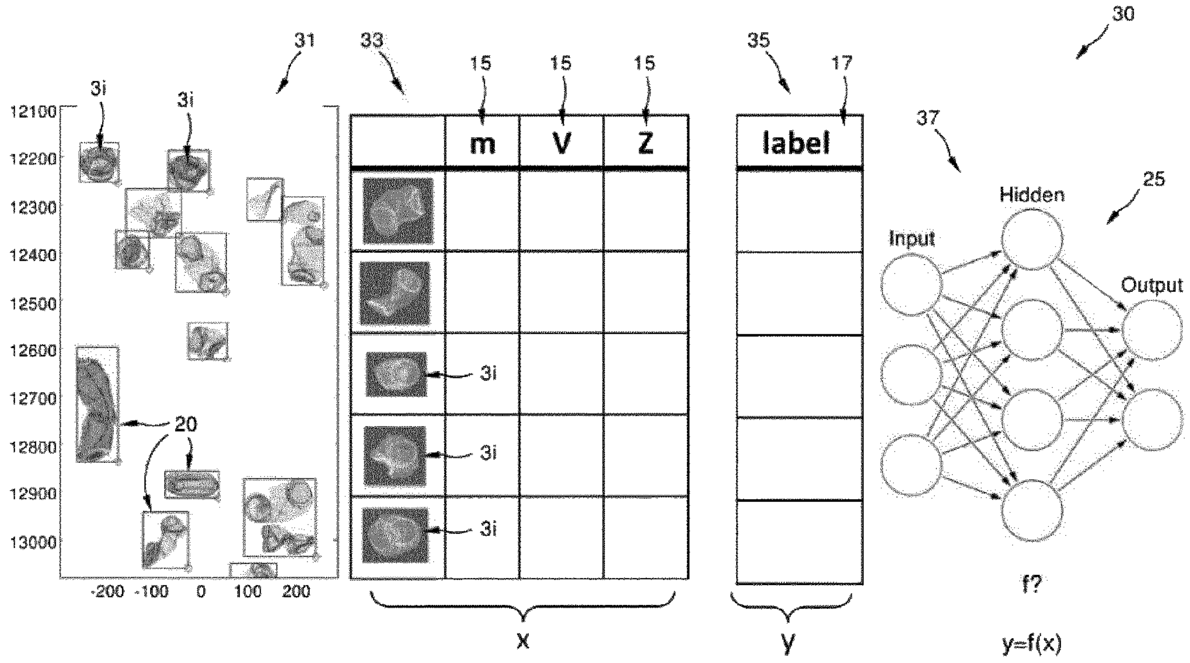
FIG. 8 shows a schematic diagram of a method.

FIG. 8 shows a schematic diagram of a method 30. In a first step 31, the objects or components of the one or more materials are identified and segmented. This can be performed by means of object-detection algorithms and/or segmentation algorithms. The image is obtained using the sensory unit 5. It is also possible that the acquired image being segmented is obtained after performing alignment and/or fusion of different images, for instance coming from different sensors or sub-units of the sensory unit 5. In this example, boxes 20 are provided around the segmented objects 3*i*. In a second step 33, characteristics/features 15 are determined for each of the segmented objects 3*i*. In this example, the mass, volume and atom number is determined. In a third step, a label can be predicted by a machine learning model. As indicated in step 37, this can be done by providing the data as an input to the trained neural network 25 for obtaining a (predicted) label 17 as output. In this example, the trained neural network is a deep learning model. However, other machine learning models can also be used, such as for example support vector machines (SVMs), decision tree-based learning systems, random forests, regression models, autoencoder clustering, nearest neighbor (e.g. kNN) machine learning algorithm, etc. In some examples, an alternative regression model is used instead of an artificial neural network.

The invention provides for a more efficient training of the machine learning model used (e.g. deep neural network). By means of active learning it is possible to reduce a number of training samples to be (manually) labeled by selectively sampling a subset of the unlabeled data (in the material stream). This may be done by inspecting the unlabeled samples, and selecting the most informative ones with respect to a given cost function for human and/or experimental labeling. The active learning machine learning model can select samples which can result in the largest increase in performance, and thereby reduce the human and/or experimental labeling effort. Selectively sampling components of the plurality of components in the material stream assumes that there is a pool of candidate components of the plurality of components to label. As there can be a constant stream of new and relatively unique components in the material stream, the stream provides for a source for continuously and effectively improve the performance of the machine learning model. Advantageously, the selected components can be isolated automatically by the system by means of a separation unit. The active learning machine model can derive a smaller subset of all components collected from the material stream for human and/or experimental labeling.

An initial deep learning neural network can be trained on a set of classified data, for example obtained by human annotation. This set of data builds the first parameters for the neural network, and this would be the stage of supervised learning. During the stage of supervised learning, the neural network can be tested whether the desired behavior has been achieved. Once a desired neural network behavior has been achieved (e.g., a machine learning model has been trained to operate according to a specified threshold), the machine learning model can be deployed for use (e.g., testing the machine with "real" data). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In some examples, the neural network of the machine learning model can provide direct feedback to another process, e.g. changing control parameters of a waste recycling process. In some examples, the neural network outputs data that is buffered (e.g., via the cloud, etc.) and validated before it is provided to another process.

Data acquisition can be performed in different ways. The sensory system may include various sensors. In an example, data with respect to the material properties of the particles in the material stream (e.g. waste stream) is gathered by means of a multi-sensor characterization device. Firstly, dual-energy X-ray transmission (DE-XRT) may allow to see "through" the material and to determine certain material properties such as average atomic number and density. The advantage is that one can inspect the complete volume and not only the surface of the component (e.g. waste material is often dirty and surface properties are therefore not necessarily representative for the bulk of the material). Secondly, additionally or alternatively, a 3D laser triangulation unit can be utilized to measure the shape of the object at high resolution (e.g. sub-mm accuracy). This allows for additional information to complement the one gathered from DE-XRT, such as 3D shape and volume. Thirdly, additionally or alternatively, a RGB detector may be used, which allows to differentiate the components in the material stream regarding color and shape. In some examples, the above mentioned sensors are used together. Optionally, image processing can be used for segmenting the images into individual components. From these segmented images, various features describing the object's shape may be computed. Examples are the area, eccentricity and perimeter of a component. In some examples, this can be done for all images obtained from all sensors.

Various neural network models and/or neural network architectures can be used. A neural network has the ability to process, e.g. classify, sensor data and/or pre-processed data, cf. determined features characteristics of the segmented objects. A neural network can be implemented in a computerized system. Neural networks can serve as a framework for various machine learning algorithms for processing complex data inputs. Such neural network systems may "learn" to perform tasks by considering examples, generally without being programmed with any task-specific rules. A neural network can be based on a collection of connected units or nodes called neurons. Each connection, can transmit a signal from one neuron to another neuron in the neural network. A neuron that receives a signal can process it and then signal additional neurons connected to it (cf. activation). The output of each neuron is typically computed by some non-linear function of the sum of its inputs. The connections can have respective weights that adjust as learning proceeds. There may also be other parameters such as biases. Typically, the neurons are aggregated into layers. Different layers may perform different kinds of transformations on their inputs to form a deep neural network.

A deep learning neural network can be seen as a representation-learning method with a plurality of levels of representation, which can be obtained by composing simple but non-linear modules that each transform the representation at one level, starting with the raw input, into a representation at a higher, slightly more abstract level. The neural network may identify patterns which are difficult to see using conventional or classical methods. Hence, instead of writing custom code specific to a problem of printing the structure at certain printing conditions, the network can be trained to be able to handle different and/or changing structure printing conditions e.g. using a classification algorithm Training data may be fed to the neural network such that it can determine a classification logic for efficiently controlling the printing process.

It will be further understood that when a particular step of a method is referred to as subsequent to another step, it can directly follow said other step or one or more intermediate steps may be carried out before carrying out the particular step, unless specified otherwise. Likewise it will be understood that when a connection between components such as neurons of the neural network is described, this connection may be established directly or through intermediate components such as other neurons or logical operations, unless specified otherwise or excluded by the context.

It will be appreciated that the term "label" can be understood as both categorical variables (e.g. using neural networks) and continuous variables (e.g. using regression models). For example, the continuous variables may have uncertainties (e.g. chemical analysis variable).

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for training a machine learning model configured to perform characterization of components in a heterogeneous material stream with a plurality of unknown components, the method comprising:

scanning the material stream by imaging of the material stream with the plurality of unknown components;

predicting one or more prediction labels and associated label prediction probabilities for each of the unknown components in the material stream by a machine learning model which is configured to receive as input the imaging of the material stream and/or one or more features of the unknown components extracted from the imaging of the material stream;

determining a training reward associated with each unknown component within the plurality of unknown components in the material stream;

determining a value associated with each unknown component that is indicative of a difficulty for performing physical isolation of the unknown component from the material stream by a separator unit;

selecting a top number of unknown components from the plurality of unknown components in the material stream based on the training reward associated with the unknown components;

selecting at least one unknown component from the top number of unknown components based at least partially on the value indicative of the difficulty for performing physical isolation, wherein the selected at least one unknown component is physically isolated from the material stream by the separator unit, wherein the separator unit is configured to move the selected at least one unknown component to a separate accessible compartment;

analyzing the isolated at least one unknown component by an analyzing unit automatically performing a characterization of the isolated at least one unknown component within the separate accessible compartment for determining a ground truth label thereof, wherein the determined ground truth label of the isolated at least one unknown component is added to a training database; and training an incremental version of the machine learning model using the determined ground truth label of the physically isolated at least one unknown component;

wherein the analyzing unit performs the characterization by subjecting the isolated at least one unknown component to an automated chemical analysis for determining the ground truth label at least partially based thereon.

2. The method according to claim 1, wherein the machine learning model is configured to receive as input one or more user-defined features of the unknown components extracted from the imaging of the material stream, and wherein user-generated selection criteria for the selection of components are employed.

3. The method according to claim 1, wherein the separator unit has at least a first separation device and a second separation device, wherein one of the first or second separation device is selected for physical isolation of the selected at least one unknown component based on the one or more features of the unknown components extracted from the imaging of the material stream.

4. The method according to claim 3, wherein the first separation device is used for physical isolation of smaller and/or lighter components in the material stream, and the second separation device is used for physical isolation of larger and/or heavier components in the material stream.

5. The method according to claim 3, wherein the first separation device is configured to isolate components by directing a fluid jet towards the components in order to blow the components to the separate accessible compartment, and wherein the second separation device is configured to isolate components by a mechanical manipulation device.

6. The method according to claim 5, wherein a resulting force induced by the fluid jet is adjusted based on the mass of the selected at least one unknown component.

7. The method according to claim 1, wherein for each unknown component in the material stream data indicative of a mass is calculated.

8. The method according to claim 1, wherein the separate accessible compartment enables a manual removal of the isolated unknown component, wherein an indication of an internal reference of the machine learning model is provided for the isolated unknown component within the separate accessible compartment, wherein the analysis of the at least one selected unknown component is performed at least partially by human annotation.

9. The method according to claim 1, wherein the characterization is by destructive measurements on the isolated at least one unknown component for determining the ground truth label at least partially based thereon.

10. The method according to claim 1, wherein the one or more features relate to at least one of a volume, dimension, diameter, shape, texture, color, or eccentricity.

11. A system for training a machine learning model which is configured to perform characterization of components in a heterogeneous material stream with a plurality of unknown components, the system including a processor, a computer readable storage medium, a sensory system, an analyzing unit and a separator unit, wherein the computer readable storage medium has instructions stored which, when executed by the processor, result in the processor performing operations comprising:

operating the sensory system to scan the material stream such as to perform imaging of the material stream with the plurality of unknown components;

predicting one or more labels and associated label probabilities for each of the unknown components in the material stream by a machine learning model which is configured to receive as input the imaging of the material stream and/or one or more features of the unknown components extracted from the imaging of the material stream;

determining a training reward associated with each unknown component within the plurality of unknown components in the material stream;

determining a value associated with each unknown component that is indicative of a difficulty for performing physical isolation of the unknown component from the material stream by-the separator unit;

selecting a top number of unknown components from the plurality of unknown components in the material stream based on the training reward associated with the unknown components;

selecting at least one unknown component from the top number of unknown components based at least partially on the value indicative of the difficulty for performing physical isolation;

operating the separator unit for physically isolating the selected at least one unknown component from the material stream, wherein the separator unit is configured to move the selected at least one unknown component to a separate accessible compartment;

receiving for the isolated at least one unknown component a ground truth label determined by the analyzing unit automatically performing an characterization of the isolated at least one unknown component within the separate accessible compartment, wherein the determined ground truth label of the isolated at least one unknown component is added to a training database; and training an incremental version of the machine learning model using the determined ground truth label of the physically isolated at least one unknown component;

wherein the analyzing unit is configured to perform the characterization by subjecting the isolated at least one unknown component to an automated chemical analysis for determining the ground truth label at least partially based thereon.

* * * * *